United States Patent
Lakic (10) Patent No.: US 9,254,817 B2
(45) Date of Patent: Feb. 9, 2016

(54) SEAT BELT ANCHOR

(71) Applicant: Jaguar Land Rover Limited, Whitley Coventry Warwickshire (GB)

(72) Inventor: Alex Lakic, Wellesbourne (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

(21) Appl. No.: 14/425,015

(22) PCT Filed: Sep. 5, 2013

(86) PCT No.: PCT/EP2013/068412
§ 371 (c)(1),
(2) Date: Feb. 28, 2015

(87) PCT Pub. No.: WO2014/037470
PCT Pub. Date: Mar. 13, 2014

(65) Prior Publication Data
US 2015/0217721 A1    Aug. 6, 2015

(30) Foreign Application Priority Data
Sep. 6, 2012   (GB) .................................. 1215937.2

(51) Int. Cl.
*B60R 22/00*    (2006.01)
*B60R 22/24*    (2006.01)
*B60J 5/10*     (2006.01)
*B62D 25/04*    (2006.01)
(Continued)

(52) U.S. Cl.
CPC ................. *B60R 22/24* (2013.01); *B60J 5/101* (2013.01); *B62D 25/04* (2013.01); *B62D 27/02* (2013.01); *B60R 2022/1818* (2013.01)

(58) Field of Classification Search
USPC ............. 280/801.1, 808; 296/203.3; 297/468, 297/482, 483
See application file for complete search history.

(56) References Cited

U.S. PATENT DOCUMENTS

| | | | |
|---|---|---|---|
| 4,220,353 A | 9/1980 | Maekawa et al. | |
| 4,397,482 A | * 8/1983 | Ogawa | B60R 22/24 280/802 |
| 4,470,619 A | 9/1984 | Imajyo et al. | |

(Continued)

FOREIGN PATENT DOCUMENTS

EP    0241035 A1    10/1987
FR    2634445 A1     1/1990

OTHER PUBLICATIONS

International Search Report for application No. PCT/EP2013/068412, dated Nov. 12, 2013, 4 pages.

(Continued)

*Primary Examiner* — Toan To
(74) *Attorney, Agent, or Firm* — Reising Ethington P.C.

(57) ABSTRACT

A vehicle has a pillar supporting a roof of the vehicle at its rear corners. The pillar provides an anchor point for a third row seat belt. The pillar has a front wall facing generally towards the front of the vehicle, a side wall and a back wall. A seat belt loop member comprising three legs in the form of a T-shape is fixed to the pillar. The first, loop-leg carries a cantilevered belt loop. The second, pad-leg is substantially aligned with the loop-leg and has a pad for abutment against the front wall. The third, anchor-leg, lies substantially orthogonal with respect to the loop and pad-legs and lies against the side wall of the pillar and is anchored to said side wall. The arrangement reduces the amount of reinforcement required for the pillar.

29 Claims, 7 Drawing Sheets

(51) Int. Cl.
  *B62D 27/02* (2006.01)
  *B60R 22/18* (2006.01)

(56) References Cited

U.S. PATENT DOCUMENTS

| | | | | |
|---|---|---|---|---|
| 4,616,850 A | * | 10/1986 | Sedlmayr | B60R 22/201 |
| | | | | 280/801.2 |
| 4,645,232 A | * | 2/1987 | Hamada | B60R 22/24 |
| | | | | 280/801.1 |
| 4,986,570 A | * | 1/1991 | Quinting | B60R 22/24 |
| | | | | 280/808 |
| 5,069,483 A | * | 12/1991 | Hirasawa | B60R 22/24 |
| | | | | 280/801.1 |
| 5,106,121 A | * | 4/1992 | Boone | B60R 22/023 |
| | | | | 280/807 |
| 5,741,987 A | * | 4/1998 | Hrynik | B25B 23/0064 |
| | | | | 200/61.42 |
| 6,302,442 B1 | * | 10/2001 | Shimozawa | B60R 22/023 |
| | | | | 280/807 |
| 6,336,662 B1 | * | 1/2002 | Kurita | B60N 2/3011 |
| | | | | 280/801.1 |
| 6,854,767 B2 | * | 2/2005 | Yakata | B60R 22/24 |
| | | | | 280/808 |
| 6,971,677 B2 | * | 12/2005 | Niimi | B60R 22/023 |
| | | | | 280/801.1 |

OTHER PUBLICATIONS

UK Combined Search and Examination Report for corresponding application No. 1215937.2, dated Dec. 17, 2012, 5 pages.
Written Opinion for application No. PCT/EP2013/068412, dated Nov. 12, 2013, 4 pages.

* cited by examiner

SEAT BELT ANCHOR

FIELD OF THE INVENTION

This invention relates to a seat belt anchor for a vehicle and in particular, but not exclusively, to a third row anchor, and to a vehicle incorporating such an anchor. Aspects of the invention relate to a connection member and to a vehicle.

BACKGROUND

Seat belts are provided in vehicles to restrain occupants in the event of a sudden braking event or accident. In some markets, legislation requires that these are provided for each seating position of a vehicle intended for a vehicle occupant to occupy. Some larger vehicles have the internal space to house a third row of seats which, when provided, are generally disposed at or near the rear of the vehicle. Some vehicle designs are intended to provide the third row as an option, because without the third row, the vehicle can still carry around five occupants and have a much larger luggage space than is the case when the third row of seats is installed. However, larger families may require the third row and prefer to forego the extra luggage space.

Seat belt anchorages or anchors are often provided in or secured to the vehicle body shell. The location of the or each seat belt anchorage relative to the seating positions provided in the vehicle are typically dictated by legislation for a given market, and the location of each anchorage should be optimised to provide comfort for the seat belt user. Most seat belts are of the three-point variety, where two lower anchors are provided on the floor of the vehicle (or lower part of the seat) to secure a lap-belt, and a single shoulder anchor or upper anchorage is usually in a side pillar of the vehicle body, to secure a shoulder belt passing across the passenger's body from the opposite lower anchor. When connected to the vehicle body, the anchor can withstand the forces required of it. However, because they are in the vehicle body, where firstly detection of damage may be difficult and secondly repair or such damage may be difficult, anchor points on the bodywork also need to be able to withstand the effects of more minor loadings without deformation. As a standard, a loading approaching 1.5 tonnes is taken as a minimum force required to be absorbed by the anchorage when applied by the seat belt. Loading exceeding 1.5 tonnes applied to the seat belt anchorage via the seat belt is likely only to be occasioned in an accident that will result in significant damage to the vehicle. However, at loadings less than 1.5 tonnes (ECE REGULATION No. 14—SAFETY BELT ANCHORAGES etc) a vehicle may not be irreparably damaged and yet damage to a seat belt anchorage cannot be permitted for the reasons just given.

Seat belt anchorages in vehicle bodies generally involve a welded nut attached to a suitable body panel and into which a bolt can be fixed to secure a seat belt element, such as a D-loop, through which the belt is guided over the user's shoulder in use; a seat belt reel; or a fixed clasp for releasable connection of a buckle of the belt. Such a nut invariably requires some reinforcement to meet the requirements of ECE Regulation 14 (or equivalent standard). The degree of reinforcement depends to some extent on the direction of the potential loading. Steel, or aluminium, panels, out of which vehicle bodies tend to be made, have great strength when formed into box sections. They are capable of accepting substantial loads when these are applied in shear. However, when forces are applied orthogonally to the plane of a panel, deformation may result from lower loads. Even when panels are reinforced, the loading is usually such as to apply a peeling load on joints in the sections (assuming these are formed, as is generally the case, by interconnected panels). Reinforcement of a panel might be effected by having a local thickening of the panel where the reinforcement is required, for example by welding another layer of the panel material to the panel around the nut (in the case of interest). Generally, only one such layer can, as a practical matter, be applied to either side of a panel.

In the case of aluminium panels, welding is impractical as most suitable nuts are made from steel and so are unsuitable for welding to aluminium. Other means of reinforcement involve the use of fillets and braces. These are all satisfactory, but they tend to be installed in a vehicle body shell prior to completion of the Body-in-White (BIW) stage of manufacture. That is the eponymous stage of vehicle manufacture at which the vehicle body is complete as an assembly of panels and has the requisite environmental proactive coatings applied prior to final paint work application and assembly of vehicle components.

At this point in manufacture, at least in respect of vehicles that might have a third row, it is certainly unknown which of them will, or will not, have this option. Certainly, it is not desirable to provide yet a further stock-keeping unit for this. Consequently, it would normally be the case that all the reinforcements required of the bodyshell for an acceptable seat belt anchor will always be provided, for all the seats that might be installed, regardless of whether or not all the vehicles so produced will be destined to have the third row of seats and employ the reinforcement provided. Obviously, for those vehicles that do not end up with a third row, the provision of the reinforcement is unnecessary.

Large passenger vehicles such as sports utility vehicles (SUV) or multi-purpose vehicles (MPV), generally have four pillars on each side that connect the roof to rest of the vehicle bodywork. The A pillar is at the front and, on either side of the vehicle, it surrounds the front windscreen; the B pillar is between the front and rear doors, and acts as a door jamb for the front doors and hangs the rear doors; the C pillar is behind the rear doors and acts as the jamb for those doors; and the D pillar is in the rear corner of the vehicle and surrounds the rear windscreen which, usually in such vehicles, is in a tailgate. Of course, multiple different options exist and the aforementioned arrangement is merely typical of SUV and/or MPV type vehicles with which the present invention is mostly concerned. However, the arrangement is typical of many other vehicle types.

Because of the rear tailgate, the D pillar therefore also usually provides a mounting for a seal against which the tailgate closes. The pillars A to D are generally hollow box sections made by welding together two or more pressed metal panels. The shapes involved can be complex, but there is a limit to the extent which such panels can be pressed and shaped prior to welding. Generally D pillars are formed from three panels welded together, often in a somewhat triangular section in places. Indeed, it is often found that, at the point where it is desirable to provide an upper seat belt anchorage, the section of the D pillar may be quite close to a right-angle triangle where the first side, the hypotenuse, is formed by the external body panel, a second side forms part of the opening frame for the tailgate, and the third side completes the pillar section and faces towards the front of the vehicle.

It should incidentally be noted, that use of these geometric descriptions in this specification are extremely approximate and for illustration only, and do not represent the precise shape of the components being described.

Pillars should have as large a cross-sectional area as possible, to increase their strength and resistance to torsion and bending. Consequently, while it would in theory be possible to align the third panel in a more parallel relation with respect to the first panel, this would reduce the cross-sectional area of the pillar and undermine the fundamental purpose of the pillar. However, having the third panel face the front is disadvantageous for the reasons discussed above for connection of a seat belt. Significant reinforcement features may be required to resist panel deformation for a given the direction of force applied via the seat belt to a seat belt anchor connected to the third panel. The seat belt cannot be connected to the second face, because that is framing the tailgate and, for reasons explained below, is actually outside the vehicle. The first, hypotenuse panel cannot be employed, as it forms the external surface of the vehicle and its orientation with respect to the seat belt may not be appropriate.

It is an object of the present arrangement to provide a seat belt anchor that addresses the points mentioned above, or at least mitigates some of the effects of the aforementioned issues.

BRIEF SUMMARY OF THE INVENTION

Aspects of the invention relate to a seat belt connection member and a vehicle as claimed the appended claims.

In accordance with an aspect of the present invention there is provided a seat belt connection member for a pillar of a vehicle, in which the pillar has front and side walls, the front wall facing generally towards the front of the vehicle, wherein the member comprises three legs in the form of a T-shape, a first loop-leg carrying a cantilevered belt connection point, a second pad-leg being substantially aligned with the loop-leg and comprising a pad and a third anchor-leg, lying substantially orthogonal with respect to the loop- and pad-legs, and comprising an anchor point for connection to the vehicle, wherein, when the connection member is installed in a vehicle, the pad-leg is suitable for abutment against the front wall of the pillar, the loop-leg is suitable for connection of a seat belt, and the anchor-leg is adapted to pass through a slot in the front wall and lie against the side wall of the pillar and be anchored thereto.

The pillar may be a roof-supporting pillar or a roll hoop pillar.

In an aspect, the present invention provides a vehicle comprising a pillar supporting a roof of the vehicle, the pillar having a front wall facing generally towards the front of the vehicle, and a side wall, a slot being formed in the front wall, and a seat belt connection member as defined above, wherein a seat belt is secured to the belt connection point, the pad-leg abuts against the front wall of the pillar, and the anchor-leg passes through the slot, lies against the side wall of the pillar and is anchored in said side wall.

Arrangements according to aspects of the invention provide numerous advantages, at least when applied to the D pillar of a vehicle. First of all, the primary pull-out force on the D pillar is applied tangentially to the side panel of the D pillar, so that the panel is stressed in shear where it has its maximum strength. Secondly, the twisting force applied by the cantilevered belt loop is shared between two "elements". The first element is the abutment of the pad against the front surface of the panel. The cross of the T-shaped belt loop member serves as a fulcrum and the loop- and pad-legs together serve as a lever. However, the pressing force applied by the pad against the front face of the D pillar need not be at the centre of the pillar, where it is weakest in resisting orthogonal forces. Instead (and this depends on the length of the second leg) the pad can press against the front wall nearer its edge, where that face is supported by its transition (or connection) to the back wall of the pillar, which therefore shares the load in its direction of maximum strength (ie in shear, substantially parallel its surface). The second element is the fulcrum itself where the turning moment of the lever can be absorbed by elastic deformation under load of the joint between the legs of the belt loop member.

Consequently, the overall result is that much less reinforcement of the D pillar needs to be provided in order to ensure that it will meet requisite safety standards. That reduction in the reinforcement requirement also has the effect of reducing the redundancy of vehicle structure in the event that a third row of seats is not, in the end, provided in a given vehicle. That is also because a central part of the strength of the anchor is provided by the belt loop member itself, which of course is added during subsequent assembly of the vehicle and only in the event that the third row of seats is ultimately employed.

It is to be noted that the arrangement employs the side wall of the pillar, assuming it to be hollow and also comprising a back wall that connects the side and front walls. As discussed above, the side wall is generally outside the vehicle because an inner flange of the side wall is used to mount the seal against which the tailgate seats when closed. However, there is no penetration of the side wall to the outside except by the bolt that anchors the anchor-leg to the side wall, inside the pillar. Only the bolt head will be outside the vehicle.

It may still be desirable to provide some reinforcement to support the anchor bolt through the side wall, either by appropriate shaping of the panel to enhance its strength or by reinforcing by attaching a further plate to locally thicken it. However, to resist torsion effects on the pillar, a more general reinforcement may be desirable, such as provided by fillets disposed between the walls of the pillar (eg between the front and side walls) above and below the anchor position. The fillets may be diaphragms or bulkheads. Where a tailgate is horizontally pivoted to the roof at the back of the vehicle, the fillets may also be formed by hinge and/or latch reinforcements.

In one embodiment, such reinforcement is required in any event and is never redundant, whether the third row of seats is employed or not. This is because such vehicles (as those to which the present invention is primarily concerned) are large estate cars or sports utility type vehicles where the tailgate is horizontally pivoted to the roof at the back of the car. Such tailgates are usually supported by gas struts, or even hydraulically actuated pistons in the case of automatically opened tailgates. Such struts or pistons are usually mounted to the D pillar and can cause repetitive strain on the D pillar which is thus usefully reinforced by such fillets.

In one embodiment, the belt connection member comprises a belt loop member in which the belt connection point comprises a loop around which a seat belt is adapted to be secured. The belt loop member may comprise a first rod formed into a loop, arms of which are interconnected by a plate and together forming said loop and pad-legs of the belt loop member, and a second rod, formed into a U-shape with its ends inclined with respect to a main body of the U-shape, which body forms the anchor-leg of the belt loop member, the ends lying in juxtaposition with, and secured to, said plate.

A captive nut may be held between the legs of said main body, by which the bolt passing through the side wall of the pillar secures the belt loop member to the pillar. Alternatively, a captive bolt may be held between the legs of said main body, wherein the thread of the captive bolt is passable through the side wall of the pillar to be secured by a nut to the pillar.

The pad-leg of the belt connection member may be secured to the front wall of the pillar to counter any rotational movement of the belt loop member about an axis substantially parallel the anchor-leg. Said securing may be by a dog on the plate engaging an aperture in the front wall. Alternatively, a captive nut may be secured internally of the front wall, a bolt passing through an aperture in the plate and being threaded in the captive nut.

Said loop that forms said loop- and pad-legs of the belt loop member may be U-shaped with its ends spaced apart but interconnected by said plate. Said plate may be connected to a remote side of said loop, on the other side thereof that lies against the pillar, and be formed with a trough so that the base of the trough constitutes said pad and abuts said front wall of the pillar when assembled. The trough in the plate may include an aperture (or two apertures) through which the ends of the second rod are threaded before being fixed in the base of the trough. The ends of the U-shaped loop may be extended and closed to complete an enclosed loop, although the ends need not be joined. In one embodiment, the plate is shaped to envelop the U-shape ends and extended loop closure so that the combined belt loop member has increased resistance against bending.

Fixing of the rods and plates may be by welding.

The hollow pillar may be a rear, roof supporting, pillar of the vehicle. The back wall may constitute a rear wing, or rear wing supporting member, of the BIW body work of the vehicle. The side wall may constitute a part of a rear tailgate frame and comprise a substantially U-shaped section in which one side of the U-section comprises a seal bearing flange for abutment by a seal surface of the tailgate and the other side said side wall, the end of said side wall overlapping and being connected to an edge of said back wall. Said front wall may be connected to the base of said U-section and to a face of said side wall, whereby the pillar has a substantially triangular section.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

One or more embodiments of the invention will now be described, by way of example only, with reference to the accompanying drawings, in which.

DETAILED DESCRIPTION

Figure 1:
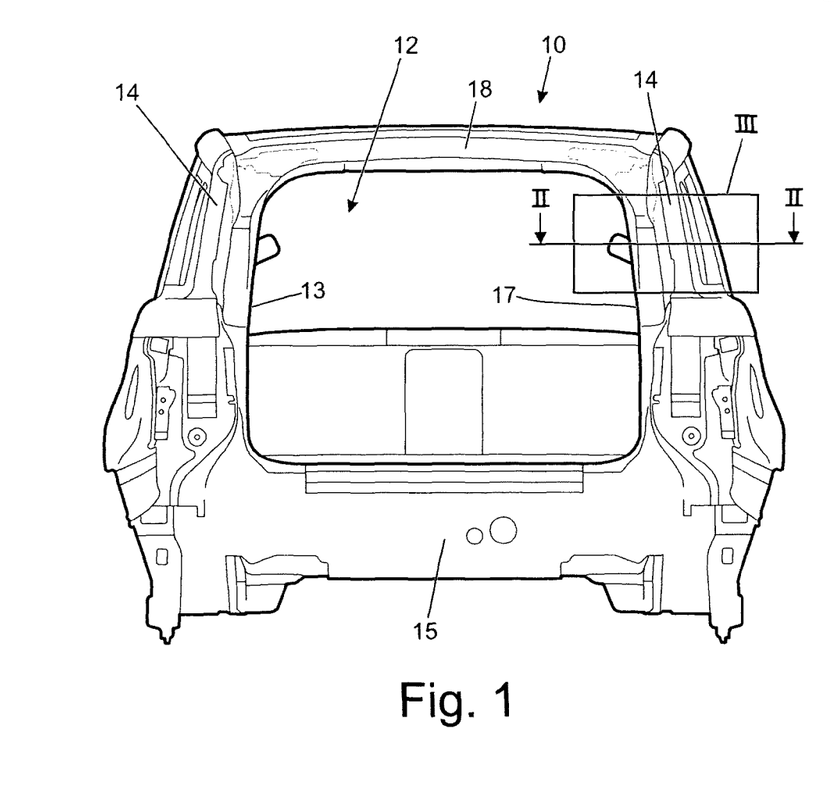
FIG. 1 is a rear view of the bodyshell of a vehicle incorporating a seat belt anchor in accordance with an embodiment of the present invention.
Figure 2:
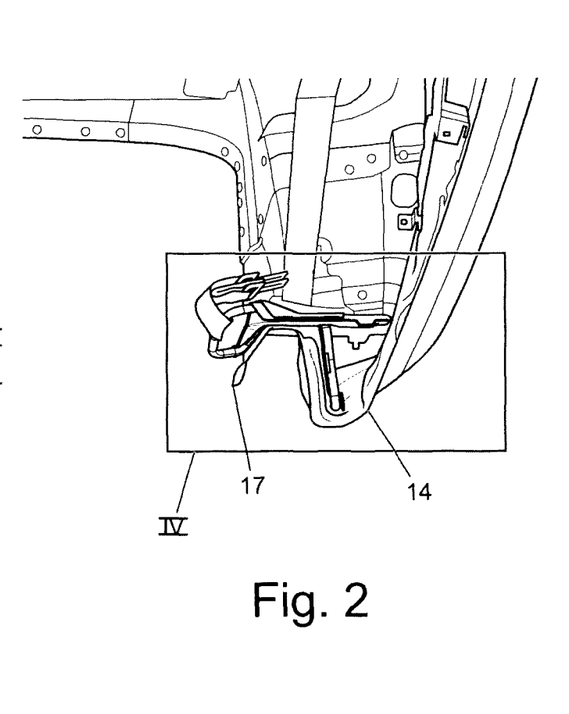
FIG. 2 is a section on or about the line II-II in FIG. 1.
Figure 3:
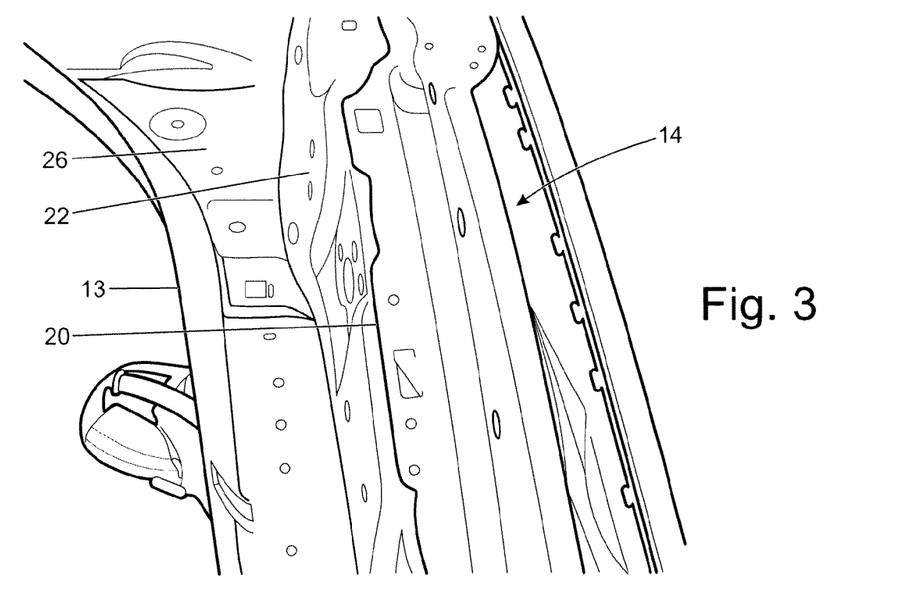
FIG. 3 is a detail III from FIG. 1.

FIG. 1 and FIG. 2 are schematic representations of a vehicle body shell 10 approaching its body-in-white (BIW) stage of manufacture. FIG. 1 is a rear view of the vehicle which, in this case, is a large "sports utility" type of passenger vehicle. It has a large passenger compartment 12 capable of accommodating three rows of passenger seats (not shown). The type of vehicle to which this invention relates is such that the third row of seats is usually provided as an optional arrangement dependent on the requirements of the customer. The choice is between a large capacity luggage space behind a second row of seats, or the capacity to carry perhaps seven passengers, which might be required by users having larger families.

The vehicle 10, as normal, has a roof 18 supported by pillars 14 from the main bodywork 15. The pillars may be hollow or solid in construction. Between the roof and bodywork, framed by the pillars (only the rear ones of which are visible in the drawings) are window and door apertures, such as a rear aperture 13. The type of vehicle to which the present invention relates is generally that which has a larger rear aperture 13 to be closed by a tailgate (not shown) which is usually hinged to the roof 18.

Where a third row of seats is provided, then of course the requisite safety belts must also be provided and since the third row of seats will always be at the rear of the vehicle, the shoulder seat belt harness anchor point for such seats finds its structural location to the vehicle most conveniently in the rear pillar 14, often referred to as the D pillar.

The construction of modern vehicles is well known and generally employs shaped steel or aluminium panels joined together to form hollow box structures that provide rigidity and strength. The present invention is no exception and the D pillar 14 is conveniently constructed from 3 separate panels (seen more easily in FIG. 4).

Figure 4:
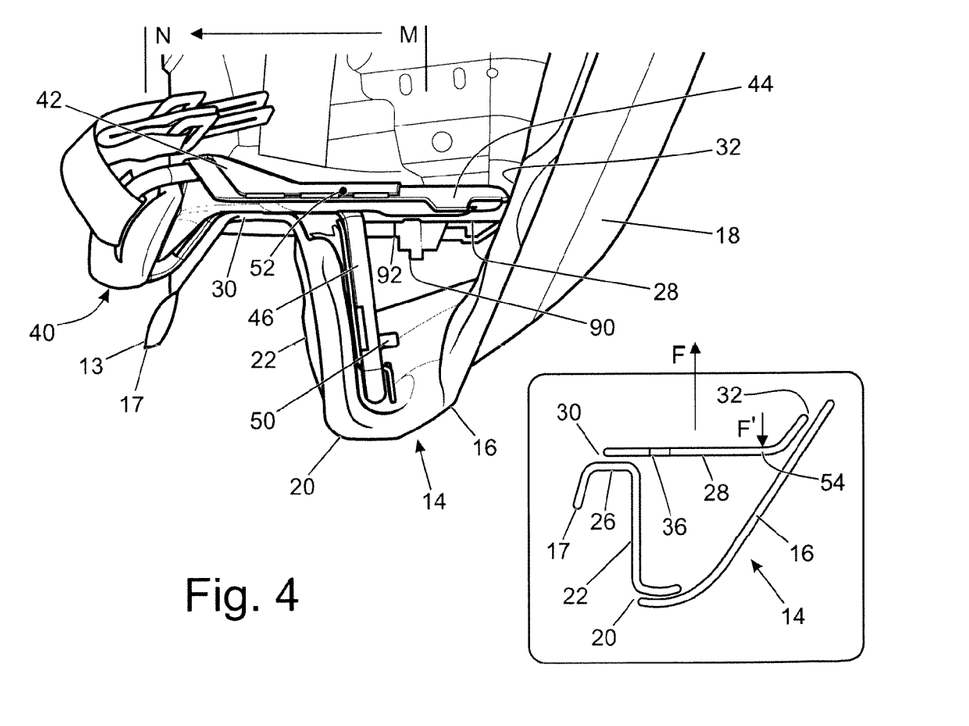
FIG. 4 is detail IV from FIG. 2.

A back panel 16 also constitutes a rear wing 18 (or at least a support for a rear wing) of the vehicle. To panel 16 is connected, at a weld seam 20, a side panel 22. That panel also forms a panel 26 that encloses the rear aperture 13.

The panel 26 presents an externally facing edge 17 that surrounds the aperture 13 and is employed to seat a U-shaped seal (not shown) against which the tailgate when fitted seats. Therefore the panel 26 and side wall 22, along with the back wall 16 are external of the vehicle. Consequently it is not desirable to penetrate these panels to provide a route for connection of a seat belt anchor, because then a problem of providing a seal is presented.

A front wall 28 of the D pillar 14 is welded to both the side panel 22 at a seam 30 and to the rear panel 16 along a seam 32. Thus the D pillar 14 is formed by three joined panels into a substantially triangular structure, as shown in the inset to FIG. 4. Only side 28 is internal of the vehicle.

Pillars, such as the D pillar 14, desirably are provided with the largest cross-sectional area possible, so that they have the greatest rigidity and resistance to torsion and bending. It would be feasible to arrange for the front wall 28 to be significantly more inclined with respect to the wall 16, but this would serve to reduce that rigidity. Instead the wall 28 faces almost directly forwards with respect to the front of the vehicle, as shown by the arrow F in the inset to FIG. 4. Consequently, if a seat belt anchor is fixed directly to the face of the front wall 28 of the D pillar 14, then that face will require substantial reinforcement. Not only would the pull (in the direction of the arrow F) of a seat belt in the event of an accident be in the direction of minimum strength of the front wall 28, it would also serve to peel apart the joints 30, 32, again in a direction where they are weakest. Panels are well known to have their maximum strength in the plane in which they lie (shear), and this also true of joints. The maximum strength of the front wall 28 is actually in a direction orthogonal to the arrow F.

Figure 4A:
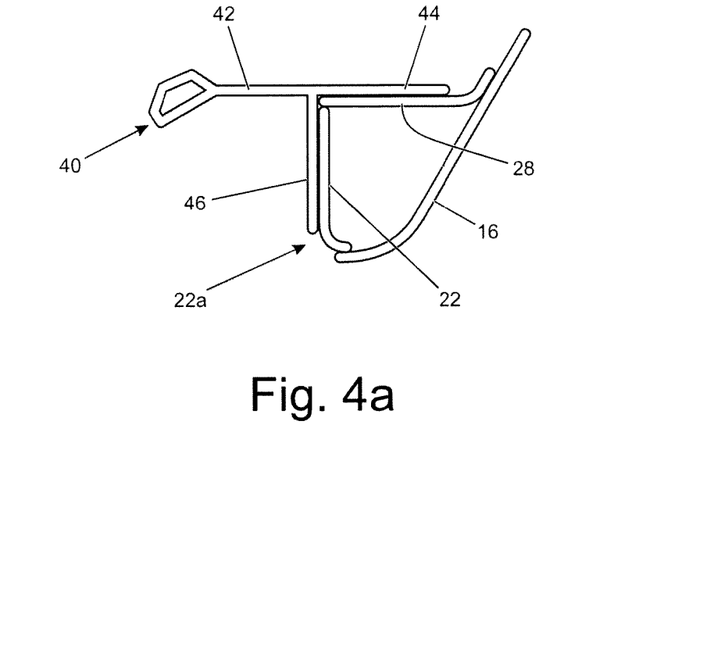
Figure 4B:
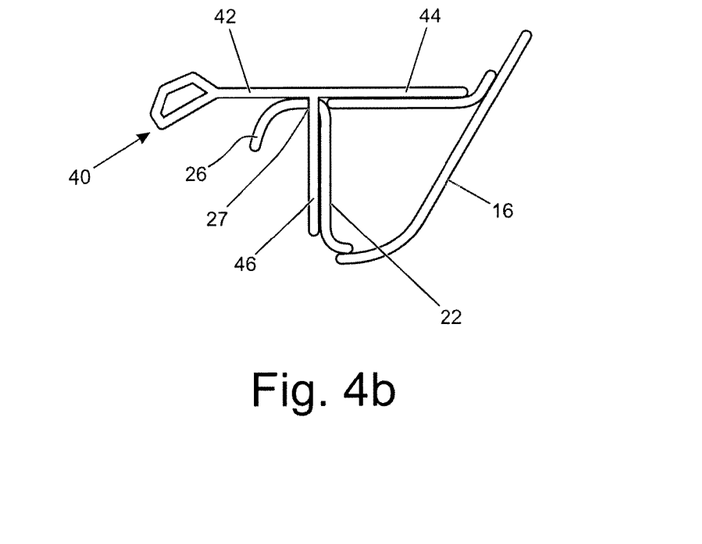

Accordingly, the present invention suggests providing a slot 36 in the front wall 28 and providing a separate belt connection, or belt loop, member 40 that is essentially T-shaped comprising three legs. The first leg is a loop-leg 42, the second is a pad-leg 44 and the third is an anchor-leg 46. The bop- and pad-legs are aligned and form the cross of the T. The anchor-leg 46 is adapted to fit through the slot 36 and be fixed to the side wall 22 using a bolt 50. As shown in FIG. 4a, in embodiments of the invention, the anchor-leg 46 is adapted to fit to the outside face of the side wall 22. The outside face 22a is the face of the side wall 22 that faces outside the internal volume defined by the side wall 22, the front wall 28 and the back will 16. Accordingly, in this embodiment the anchor-leg 46 does not pass through a slot in the front wall 28 of the piller, independent of whether or not a slot is present. However, as shown in FIG. 4b, in some embodiments, the anchor-leg 46 passes through a slot 27 in the panel 26.

Seat belts, to be comfortable for the user, should lie over one shoulder of the user and extend directly rearwardly from the shoulder. This is seldom possible because there is generally no available anchor point directly behind either shoulder of a passenger. Accordingly, a compromise is generally required and this does sometimes lead to passenger discomfort if the seatbelt should slip off the shoulder. A feature of the present invention is that the passenger comfort is increased by the belt loop member translating the point of safety belt connection inboard of the D pillar 14. This is represented by the transition M to N illustrated in FIG. 4. Apart from this enhanced comfort feature of the present invention the primary benefit of the present invention is two-fold, as follows:

The first primary benefit is that the anchor-leg 46 of the belt loop member 40 extends through the slot 36, or otherwise as described above, and is connected to the side wall 22 of the pillar 14 so that the primary forces experienced (when the seat belt connected to the belt loop member 40 is tensioned) are in the plane of the side wall 22 (ie, in the direction of the arrow F). This is in the direction of maximum strength of the wall 22. Consequently, the degree of reinforcement required to the wall 22 is minimised. In addition, by virtue of the cantilevered displacement of the line of force, the effect of loop belt member 40 is to act as a lever comprising the legs 42, 44 acting on a fulcrum 52, being the joint between the three legs 42, 44, 46. The effect of the fulcrum and lever is not only a pull on the anchor-leg 46, but also pressing by the pad-leg 44 against the front wall 28 of the D pillar. However, although the force on the front wall 28 applied by the pad-leg 44 is orthogonal to the front wall 28 (in the direction F' in the inset to FIG. 4), nevertheless it is applied at a point 54 directly adjacent to the connection of the wall 28 to the back wall 16. So the force is primarily absorbed as a shear in the plane of the back wall 16. Furthermore, the force applied to the joint 32 is also in shear, rather than having a peeling effect (which would be the case if the force was in the opposite direction). Finally, a substantial part of the load imposed by the tension on the seat belt would be absorbed by deflection of the belt loop member 40 itself, and a bending moment of the loop-leg 12 in the direction of the arrow F about the pivot point 52.

The second primary benefit of the arrangement of the present invention is that the strength of the connection is largely supplied by the belt loop member 40 itself and its geometry. Accordingly, when the option is selected not to employ a third row of seats the requisite strength is not unnecessarily provided in the BIW bodywork. That is to say, the requisite structure of the BIW bodywork is little different to what it would necessarily be even if the third row of seats and the requisite seat belt anchor was never required. Consequently there is little redundancy of structure.

Turning to FIGS. 5 to 8, the arrangement of the belt loop member 40 is shown. This comprises two loops of shaped steel rod 60, 70. The first rod 60 is formed with a U-shape where the base 62 of the U forms a pulley-loop around which a safety belt (not shown) slides. The arms 64, 66 of the U-shape are connected by a plate 80 by welds 82. The ends 68 are extended and joined to close the U shape into an approximate oval shape. The plate 80 is shaped to fit around the arms 64, 66 and ends 68 to provide more intimate connection between them. The shaping also provides a trough 84 within the loop 60 to form a pad 86 adapted to lie against the front wall 28 of the pillar 14. A central aperture 88 of the trough 44 enables a bolt connection 90 to a captive nut 92 (see FIG. 4) provided on the inside surface of the wall 28. As explained further below, the bolt 90 prevents rotation of the belt loop member about the leg 46.

The second rod 70 is also U-shaped and likewise mounts a plate 100 secured to arms 72, 74 of the rod 70 by welds 102. A captive nut 104 is provided on the plate 100 adapted to receive anchor bolt 50 from outside the side wall 22 (see FIG. 4 and inset to FIG. 6). Ends 78 of the rod 70 are bent at an angle of approximately 100° to the plane of the U-shape of the rod 70 (ie including the arms 72,74). This angle depends entirely on the geometry of the D pillar 14 and should always be approximately perpendicular for maximum strength. The ends 78 of the rod 70 are threaded through apertures 89 in the plate 80 and welded to the remote face 87 of the plate 80 by welds 76. A cover plate 110 may be welded by welds 112 to the rear face 87 of the plate 80 in order to cover the ends 78, both for the sake of improving the external appearance of the belt loop member 40 and providing additional reinforcement of the connection of the legs 78 to the plate 80.

Figure 5:
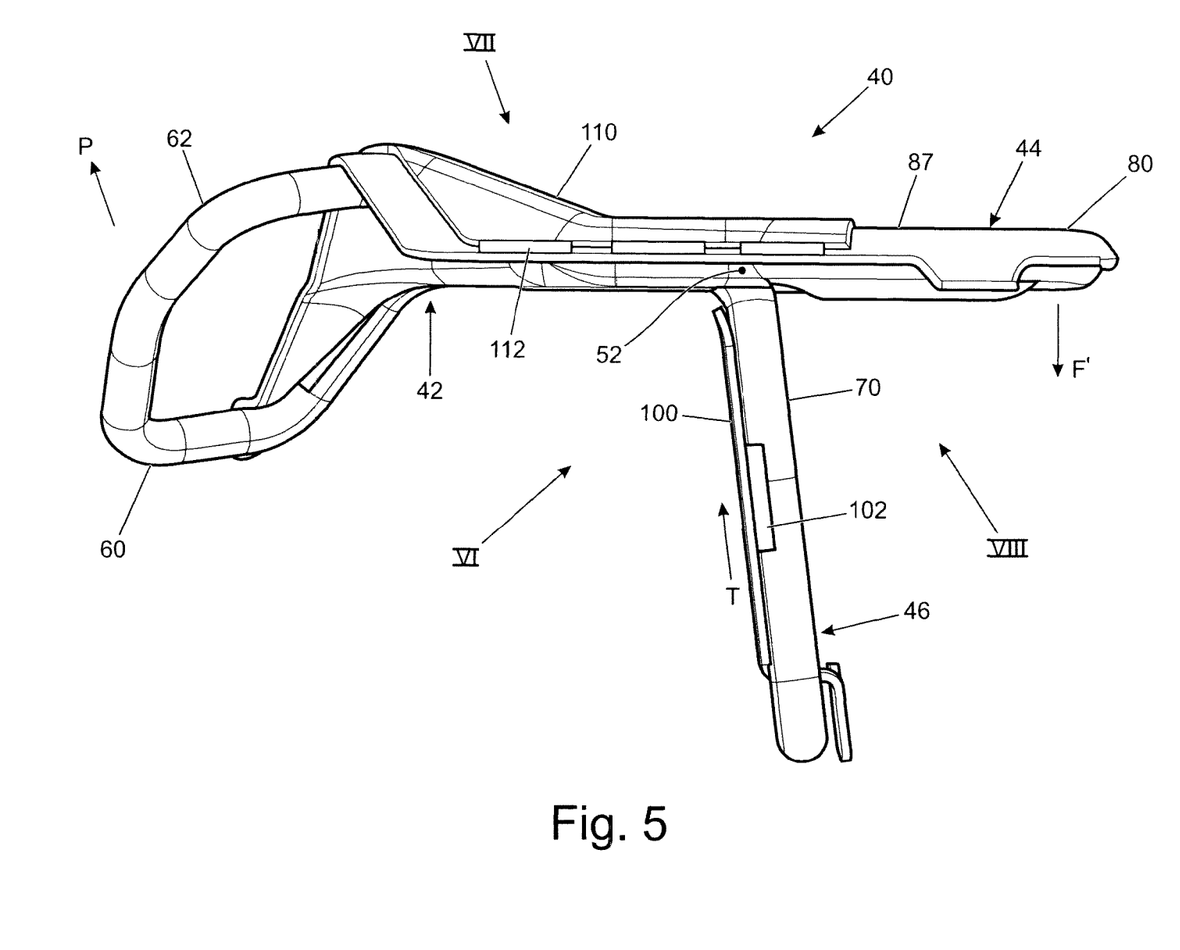
FIG. 5 is a top view of a belt loop member employed in an anchor embodying one form of the present invention.
Figure 6:
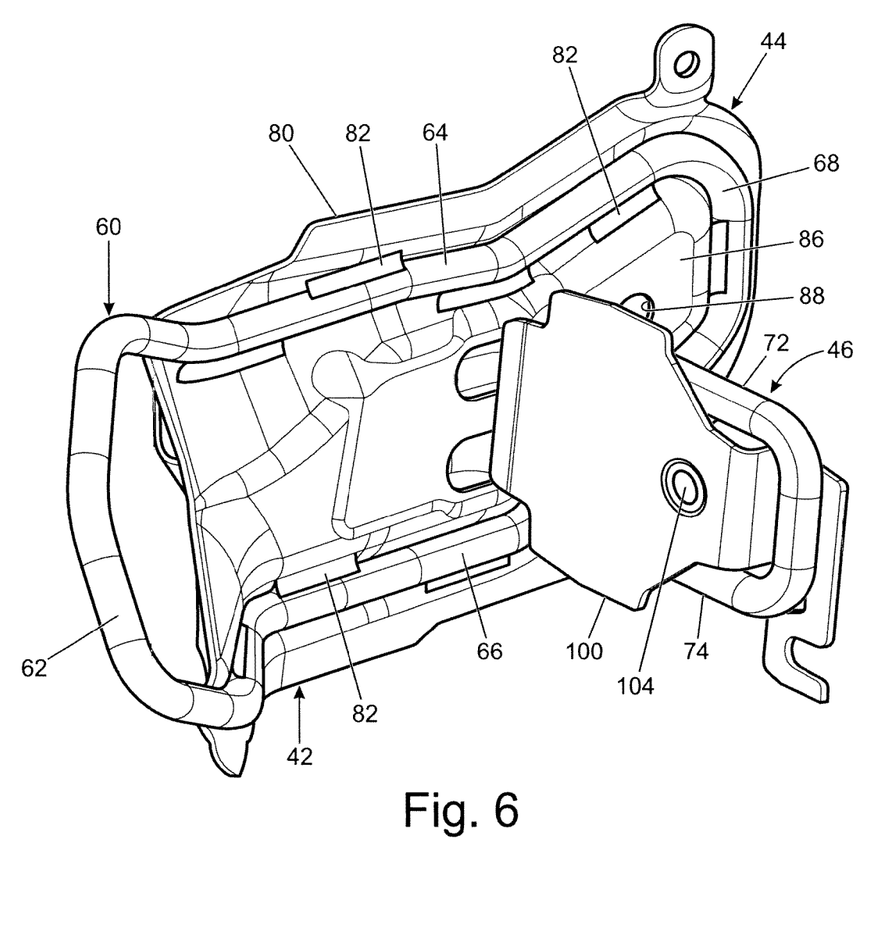
FIG. 6 is a view in the direction of the arrow VI in FIG. 5.
Figure 7:
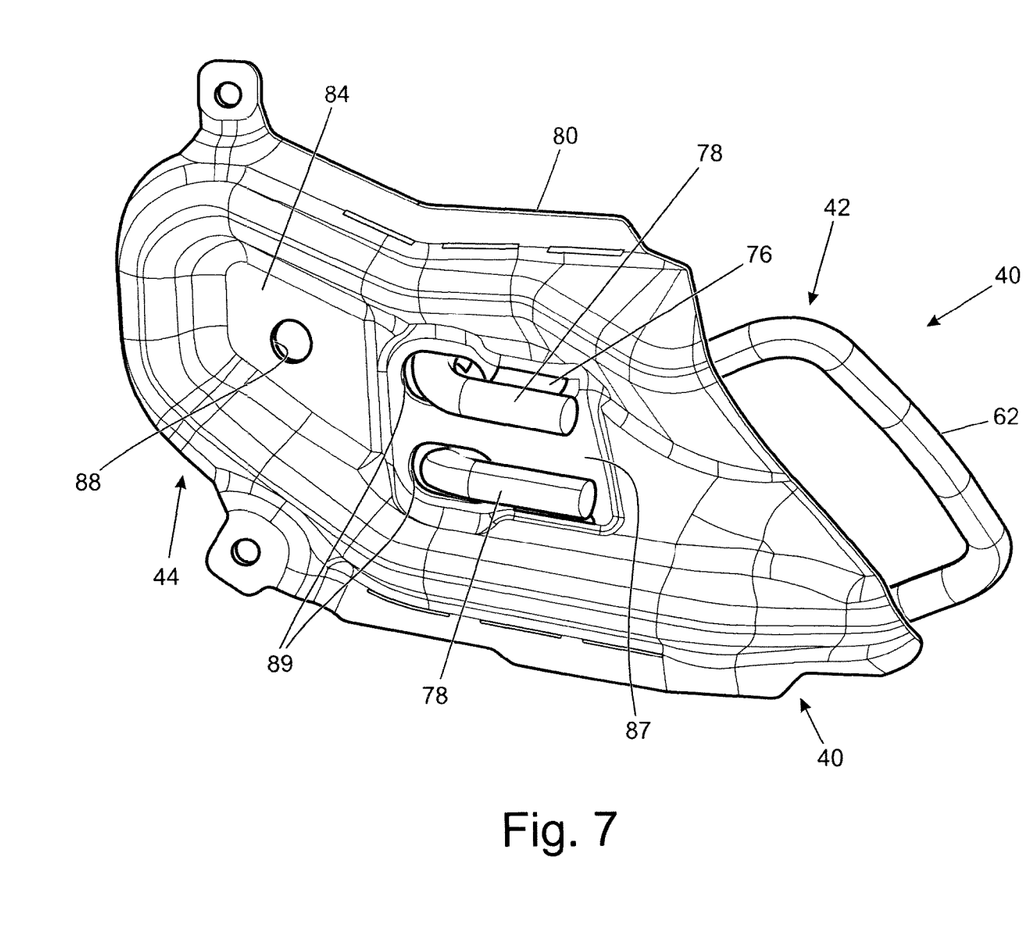
FIG. 7 is a view in the direction of the arrow VII in FIG. 5.
Figure 8:
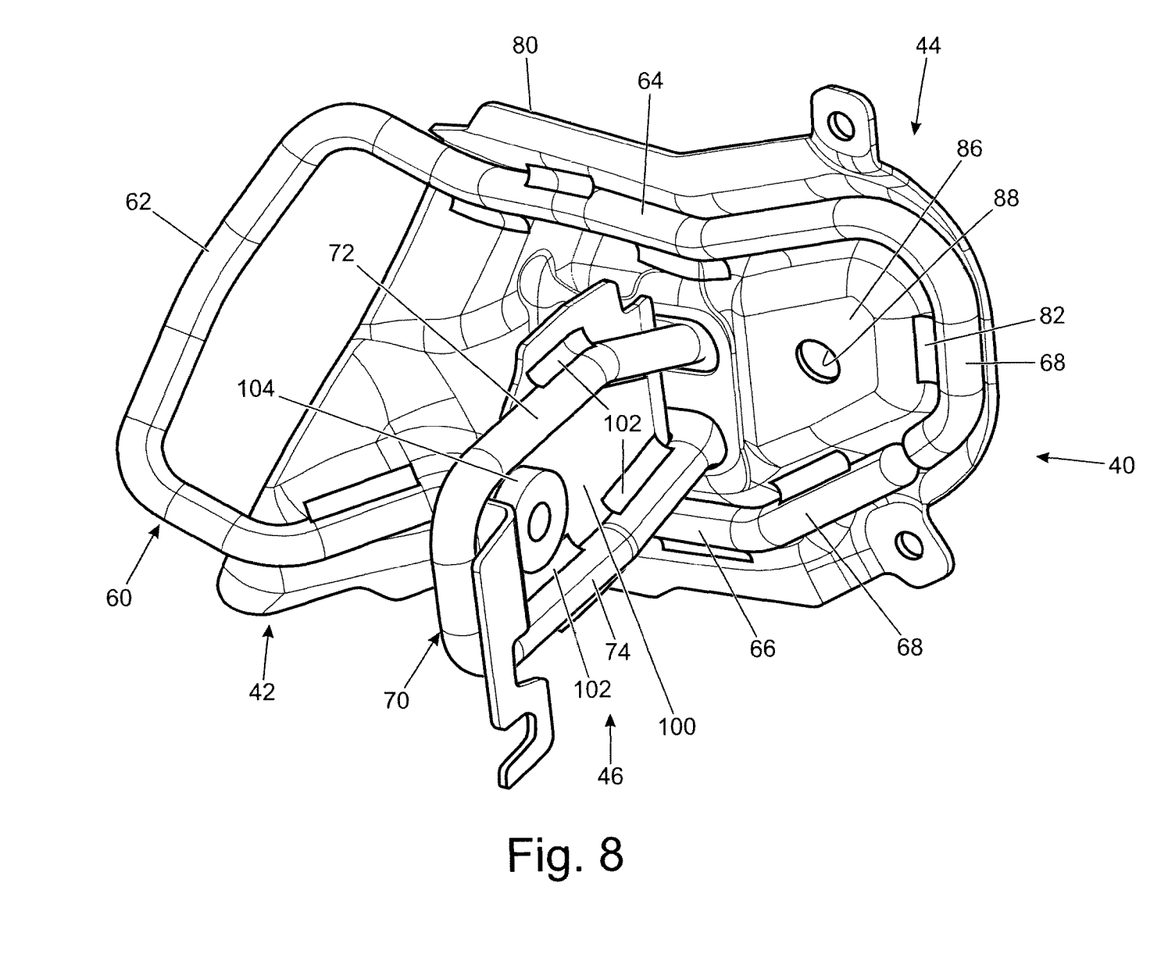
FIG. 8 is a view in the direction of the arrow VIII in FIG. 5.

Thus, turning to FIG. 5, the effect of a pull P (eg caused by a front impact accident) applied to the loop 62 of the rod 60 applies a primary tension T on the rod 70 with a resultant pressure F' applied to the front wall of the pillar, and a bending moment of the legs 64, 66 of the rod 60 and the plate 80 about fulcrum 52. The legs 78 of the rod 70 resist this bending moment by flexing themselves about the axis 52.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

The invention claimed is:

1. A seat belt connection member for a pillar of a vehicle, in which the pillar has front and side walls, the front wall facing generally towards the front of the vehicle, wherein the member comprises three legs in the form of a T-shape, a first loop-leg carrying a cantilevered belt connection point, a second pad-leg being substantially aligned with the loop-leg and comprising a pad and a third anchor-leg, lying substantially orthogonal with respect to the loop- and pad-legs, and comprising an anchor point for connection to the vehicle, wherein, when the connection member is installed in a vehicle, the pad-leg is suitable for abutment against the front wall of the pillar, the loop-leg is suitable for connection of a seat belt, and the anchor-leg is adapted to lie against the side wall of the pillar and be anchored thereto.

2. A connection member as claimed in claim 1, wherein the anchor-leg is adapted to pass through a slot in the front wall.

3. A connection member as claimed in claim 1, in which the loop- and pad-legs constitute a lever, actuated by a seat belt when connected to the connection point, the connection of the loop- and pad-legs with the anchor-leg forming a fulcrum for the lever which is adapted, in use, to bear against the front wall through said pad-leg.

4. A connection member as claimed in claim 3, in which the lever is resiliently flexible at the fulcrum, whereby a turning moment of the lever caused by tension applied to the connection point is partly absorbed by elastic deformation of the lever.

5. A connection member as claimed in claim 1, in which the anchor point comprises a captive nut on the anchor-leg.

6. A connection member as claimed in claim 1, in which the connection member is a belt loop member in which the belt connection point comprises a loop around which a seat belt is adapted to be secured.

7. A connection member as claimed in claim 6, in which the belt loop member comprises a first rod formed into a loop, arms of which are interconnected by a plate and together forming said loop- and pad-legs of the belt loop member, and a second rod, formed into a U-shape with its ends inclined with respect to a main body of the U-shape, which body forms the anchor-leg of the belt loop member, its ends lying in juxtaposition with, and secured to, said plate.

8. A connection member as claimed in claim 7, in which the anchor point comprises a captive nut on the anchor leg and said captive nut is held between the legs of said main body.

9. A connection member as claimed in claim 7, in which said loop that forms said loop- and pad-legs of the belt loop member is U-shaped with its arms spaced apart and interconnected by said plate.

10. A connection member as claimed in claim 9, in which said plate is connected to a remote side of said loop, on the other side of the loop that is adapted to lie against the pillar of the vehicle, and is formed with a trough so that the base of the trough constitutes said pad for abutting said front wall of the pillar when assembled.

11. A connection member as claimed in claim 10, in which the trough in the plate includes at least one aperture through which the ends of the second rod are threaded before being fixed in the base of the trough on its remote side.

12. A connection member as claimed in claim 10, in which the ends of the U-shaped loop are extended and closed to complete an enclosed loop.

13. A connection member as claimed in claim 12, in which the plate is shaped to envelop the U-shape ends and extended loop closure so that the belt loop member has increased resistance against bending.

14. A connection member as claimed in claim 7, in which interconnection of the rods and the plate is by welding.

15. A connection member as claimed in claim 1, in which the pad-leg of the belt connection member is provided with connection means to enable securing of the pad-leg to the front wall of the pillar to counter any rotational moment of the belt loop member about an axis substantially parallel the anchor-leg.

16. A connection member as claimed in claim 15, in which said connection means comprises a dog on the plate suitable for engaging an aperture in the front wall.

17. A connection member as claimed in claim 15, in which said connection means comprises an aperture in the plate, through which a bolt is adapted to pass, in use, and be threaded in a further captive nut secured internally of the front wall of the pillar.

18. A connection member as claimed in claim 7 comprising a front sheet fixable to the loop leg and the pad leg so as to increase the stiffness of the plate.

19. A vehicle comprising a pillar supporting a roof of the vehicle, the pillar having a front wall facing generally towards the front of the vehicle, and a side wall, and a seat belt connection member as claimed in any preceding claim, wherein a seat belt is secured to the belt connection point, the pad-leg abuts against the front wall of the pillar, and the anchor-leg lies against the side wall of the pillar and is anchored in said side wall.

20. A vehicle as claimed in claim 19, in which a slot is formed in the front wall and the anchor-leg passes through the slot.

21. A vehicle as claimed in claim 20, in which said pillar is hollow comprising a further, back, wall connecting said front and side walls, said anchor-leg lying against the inside of the side wall of the pillar.

22. A vehicle as claimed in claim 19, in which the pad-leg abuts the front wall near the edge of the front wall where that wall is supported by its transition to the back wall of the pillar.

23. A vehicle as claimed in claim 20, in which the slot in the front wall is adjacent the transition of the front wall and side wall.

24. A vehicle as claimed in claim 19, in which the anchor point comprises a captive nut on the anchor-leg and a bolt passes through an aperture in the side wall of the pillar, the bolt being fixed in said captive nut on the anchor-leg.

25. A vehicle as claimed in claim 19, in which fillets are disposed between the walls of the pillar, optionally connected only to the front and side walls, above and below the position where the anchor-leg is anchored to the side wall.

26. A vehicle as claimed in claim 20, in which the hollow pillar is a rear, roof supporting, pillar of the vehicle, and in which:
  the back wall constitutes a rear wing, or rear wing supporting member, of the vehicle; and/or
  the side wall constitutes a part of a rear tailgate frame and comprises a substantially U-shaped section in which one side of the U-section comprises a seal-bearing flange for abutment by a seal surface of the tailgate and the other side of the U-section comprises said side wall, an end edge of said side wall overlapping and being connected to an edge of said back wall; and/or
  said front wall is connected to the base of said U-section and to a face of said side wall.

27. A vehicle as claimed in claim 26, in which the pillar has a substantially triangular section.

28. A vehicle as claimed in claim 26, in which the pillar when assembled and ready for structural reception of the belt connection member, is part of the BIW stage of vehicle construction.

29. A vehicle as claimed in claim 25, in which a tailgate is horizontally pivoted to the roof at the back of the vehicle, the tailgate being supported by gas struts, or by hydraulically actuated pistons in the case of automatically opened tailgates, and in which said struts or pistons are mounted to the pillar between said fillets.

* * * * *